United States Patent [19]

Heimark

[11] Patent Number: 5,909,075
[45] Date of Patent: Jun. 1, 1999

[54] BELT TRANSMISSION AND CLUTCH FOR VEHICLE ACCESSORIES

[76] Inventor: Charles L. Heimark, 10254 Brittany Way, Eden Prairie, Minn. 55347

[21] Appl. No.: 09/058,383

[22] Filed: Apr. 8, 1998

[51] Int. Cl.$^6$ ............................. H02K 49/00; H02K 7/10; H02K 16/00
[52] U.S. Cl. ............................. 310/103; 310/96; 310/101; 310/114; 192/48.2; 192/48.7; 192/48.9; 192/54.4; 474/86
[58] Field of Search ............................. 310/103, 78, 101, 310/92, 75 R, 76, 112, 96, 100, 102 A, 114, 120, 118, 94, 97, 108; 192/48.2, 48.4, 48.7, 48.9, 54.4, 56.4, 84.1; 474/32, 35, 85–86, 168–170

[56] References Cited

U.S. PATENT DOCUMENTS

| | | | |
|---|---|---|---|
| 3,463,027 | 8/1969 | Gelb | 74/365 |
| 3,620,339 | 11/1971 | Becking | 192/84 A |
| 3,675,747 | 7/1972 | Obermark | 192/48.2 |
| 3,842,378 | 10/1974 | Pierce | 335/220 |
| 3,924,585 | 12/1975 | Woods | 123/41.12 |
| 4,257,508 | 3/1981 | Bennett et al. | 192/84 A |
| 4,314,472 | 2/1982 | Saegusa et al. | 72/341 |
| 4,484,495 | 11/1984 | Mason | 74/785 |
| 4,488,627 | 12/1984 | Streich et al. | 192/84.2 |
| 4,564,092 | 1/1986 | Pierce | 192/48.2 |
| 4,589,534 | 5/1986 | Apetrei et al. | 192/18 B |
| 4,718,526 | 1/1988 | Koitabashi | 192/35 |
| 5,545,103 | 8/1996 | Gustin | 475/223 |
| 5,575,370 | 11/1996 | Gonda et al. | 192/84.96 |
| 5,575,371 | 11/1996 | Gonda et al. | 192/84.96 |

*Primary Examiner*—Nestor Ramirez
*Assistant Examiner*—Dang Dinh Le
*Attorney, Agent, or Firm*—Mackall, Crounse & Moore, PLC

[57] ABSTRACT

A crankshaft-mounted, multiple-speed electromagnetic clutch for driving multiple rotary devices of an engine, the engine having a crankshaft, the clutch comprising: a clutch support plate mounted to the crankshaft; a spring connected to the clutch support plate; a pair of clutch plates connected to the spring with the spring biasing the pair of clutch plates toward the clutch support plate; a pair of rotors rotating about the crankshaft on bearings; an electromagnet fixedly engaging each of the rotors and adapted to attract one of the clutch plates against the rotor, thereby transferring the rotational force of the crankshaft to the rotor; and a transmission device connecting each of the rotors to the rotary device.

15 Claims, 3 Drawing Sheets

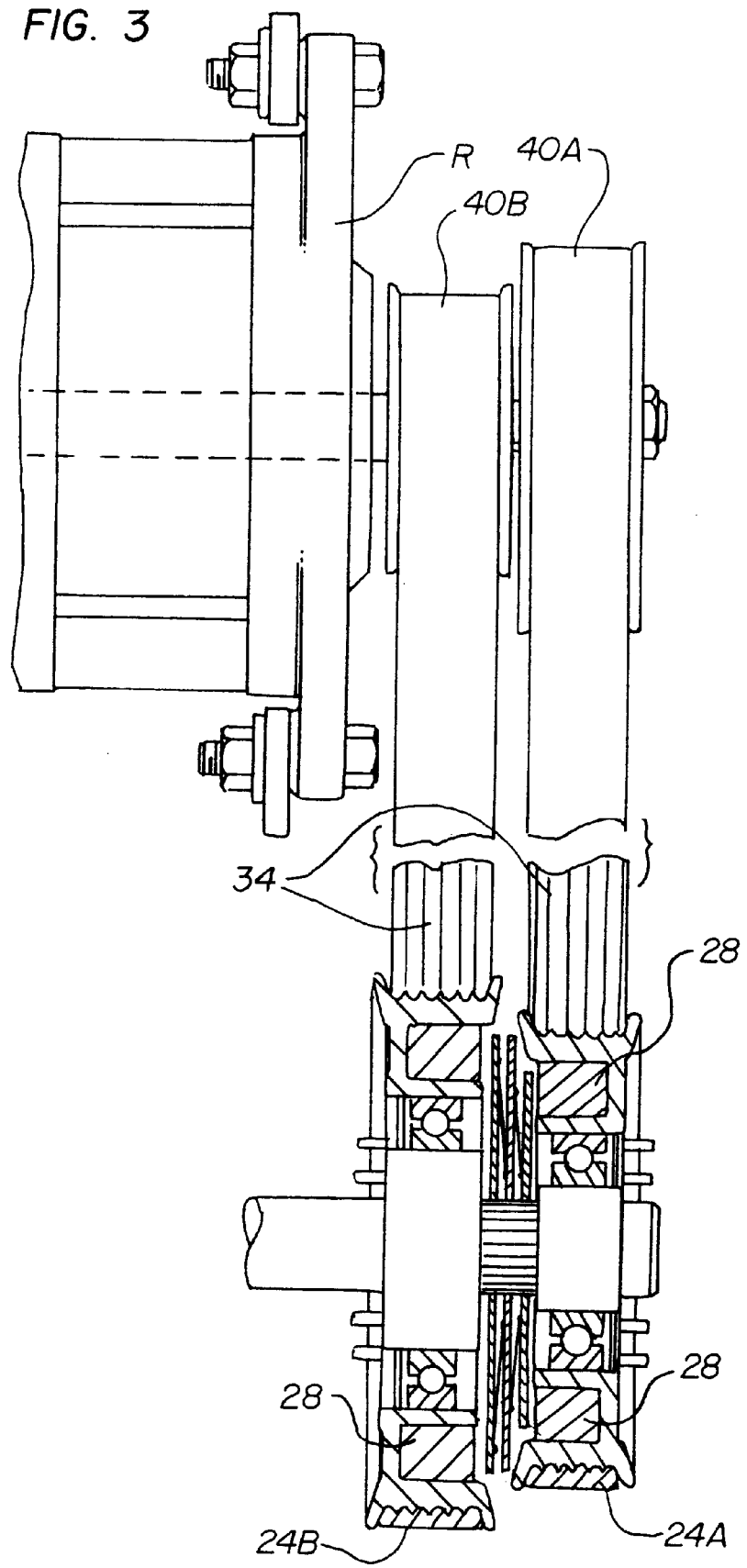

BELT TRANSMISSION AND CLUTCH FOR VEHICLE ACCESSORIES

BACKGROUND OF THE INVENTION

This invention relates to a multiple-speed electromagnetic clutch with a belt drive that is mounted on an engine crankshaft to drive multiple rotary devices.

One device that might be driven by such a clutch is a turbocharger.

Many techniques have been devised to increase the performance of automotive internal combustion engines. Supercharger and turbocharger systems have been developed that substantially boost engine performance. These systems operate to increase air pressure delivered to the intake manifold of the engine before being mixed with the fuel. The increased air pressure enhances the combustibility of the fuel, thus making it more powerful. This added power then increases engine power and torque at both lower and higher rpms than would otherwise be possible. Turbo chargers are simple and cheap, unlike superchargers that do not suffer from a response lag time because they are generally mechanically driven. Superchargers are more complicated and can be very expensive, although they do solve the problem of incomplete combustion when an engine is initially leaving idle speeds. Acceleration is also greatly improved with a typical mechanically driven supercharger.

However, the complicated belts and pulleys used in mechanical superchargers require for operation as much as 40% of the engine's power output, which exacts a price of shortening the engine's life span for the increased performance.

Turbochargers, on the other hand, are passive performance boosting devices that are driven by the exhaust from the engine. The passive design of the turbocharger does not adversely affect the life span of the engine to the degree that a supercharger does.

Turbochargers suffer a lag in response time because they are driven by exhaust gases and these gases are under very little pressure and velocity when the engine is at idle. The turbocharger has very little rotational velocity to supply the engine with all the fresh air that is needed to complete combustion of all the fuel that is being forced into a vehicles combustion chamber. Hence large Semi's, ships, tractors, trucks, power plants and transit buses can be seen emitting black smoke as the diesel fuel is not completely burned initially on some heavy vehicles.

The turbo chargers have not gotten over their initial lag before they offer a power boost to the engine.

Even cars are being equipped more frequently with turbo chargers as engine size and weight must be kept to a minimum but the driving public wants more power from these smaller engines. These automobiles will suffer from the same incomplete combustion as larger vehicles although it will be less obvious from a visual point of view and surely less time in duration, but incomplete combustion none the less.

To overcome this some areas of the country are requiring oxygenated fuels, and low-sulfur diesel, be burnt in all of their vehicles especially during certain times of the year. Auto manufacturers are also to begin producing 85 compliant motors for vehicles. In essence, these vehicles can burn a mixture of 85 per cent ethanol and 15 per cent gasoline. This extra oxygen improves the initial lack of oxygen some vehicles suffer from on acceleration from low speeds or stopped conditions thereby reducing pollutants and smog contributing effects. If these engines were to be adjusted lean enough (oxygen rich-fuel stingy), for all operating conditions they would overheat during highway conditions on warm days. They can be adjusted and controlled to burn completely at cruising speeds but that leaves an oxygen-deprived state at idle.

Smaller engines in personal vehicles would be possible and acceptable to the consuming public if there was a way to turbocharge these vehicles without the hassle that comes with present turbochargers. This hassle is the warm-up period before a car is driven at highway speeds and a cooling-off period before the engine is shut off.

Presently, catalytic converters aid in the low emissions scenario of most gasoline powered engines, but these only work after they have become hot, and are little or no help to a cleaner burning engine when the engine is first started up, and before it is warmed up.

Another problem with ordinary turbochargers is that heat of the exhaust gases which drive the turbocharger is transferred to the center bearing that provides support for the turbocharger's turbine. Present designs typically have an oil supply and engine coolant supply going to the turbocharger bearing. This is to maintain lubrication and cooling to this critical bearing while the engine is running. This design is adequate as long as the engine is operating. However, when the engine is shut off the oil and coolant stop flowing immediately and if the bearing is supporting a hot turbine that has just been revolving at 40,000 rpm's or more the bearing literally begins to cook.

Most recommendations are for allowing the motor to idle 3 minutes before shutting off the engine. This allows this bearing to cool off before removing critical oil and cooling from the bearing. Repeated occurrences of shutting off the engine before allowing an adequate cooling-off time for the turbocharger bearing leads to premature bearing failure and expensive repairs.

Several solutions have been developed to overcome the problem of turbo lag. One solution combines a supercharger with a turbocharger. The supercharger drives the turbocharger until the engine has reached a threshold level at which point it takes over the supercharger's job. This has the advantage of limiting the use of the supercharger, but it also has the drawback of being an active system that shortens engine life, as well as being overly complex.

By driving a simple turbocharger by a belt, and keeping it simple and inexpensive, the best of both can be achieved. By removing the turbine from exhaust gas stream, the excess heating to the turbine bearing is minimized and the compressed air itself is the only factor for heating. However, this heat transfers minimally to the bearing. The bearing is thus able to better withstand possible abuse by the average driver who doesn't want to be bothered by details, such as letting the engine run for several minutes after they reach their destination.

One simple yet effective way of driving a turbocharger with a belt is to place a multiple-speed electromagnetic clutch on the engine crankshaft and drive the turbocharger from a belt attached to the clutch.

By placing the clutch on the crankshaft rather than on the specific rotary device to be driven, the crankshaft can drive multiple rotary devices, in addition to a turbocharger, such as alternators, generators, air conditioners, fans, etc.

Two-speed electromagnetic clutches for driving a single engine rotary device are known, as shown by U.S. Pat. No. 3,675,747. However, there are a number of disadvantages with these devices.

First, these devices attach directly to the rotary device to be driven, rather than to the engine crankshaft. Therefore, they are only capable of driving a single rotary device. In order to drive multiple rotary devices at different speeds, multiple clutches must be used, with a clutch per rotary device to be driven and corresponding additional belts between each clutch and the crankshaft.

Second, these devices are constructed with components only of sufficient size to drive a single device, because that is the intent. They are not robust enough to drive multiple devices, even if some way was found to do so. For example, the '747 patent operates by having the electromagnet move to alternate clutch plates, rather than having the clutch plates move to the electromagnet. By having the magnet move instead of the clutch plate, this device limits the amount of power that can be transmitted through the pulleys because layered torsion springs can not be added in heavy-duty applications. Also, when the magnet moves over to engage the clutch plate, the electric windings about the magnet will be compromised in short order and wires will be worn through and electrical continuity will be lost because it is the face of the magnet coming into contact with the clutch plate that is doing all of the holding. In a conventional electromagnet, the electromagnet is in a fixed position laterally with respect to the shaft and a casing is around the magnet. This will protect the magnet's facing.

Thirdly, any of these devices that mount to the driven device could not be used with a device such as an alternator or generator, because the magnetic field of the electromagnet would conflict with the magnetic fields present about such devices. These devices are therefore limited to non-electromagnetic rotary devices such as fans or air conditioner pumps.

It is the object of the present invention to overcome the above-listed disadvantages of earlier two-speed electromagnetic clutches.

SUMMARY OF THE INVENTION

A crankshaft-mounted, multiple-speed electromagnetic clutch for driving multiple rotary devices of an engine, the engine having a crankshaft, the clutch comprising: a clutch support plate mounted to the crankshaft; a spring connected to the clutch support plate; a pair of clutch plates connected to the spring with the spring biasing the pair of clutch plates toward the clutch support plate; a pair of rotors rotating about the crankshaft on bearings; an electromagnet fixedly engaging each of the rotors and adapted to attract one of the clutch plates against the rotor, thereby transferring the rotational force of the crankshaft to the rotor; and a transmission device connecting each of the rotors to the rotary device.

A principal object and advantage of the present invention is that, because it is mounted on the crankshaft, it can drive several rotary devices with only one set of belts and one clutch.

A second object and advantage of the present invention is that it is robust enough to drive several rotary devices.

A third object and advantage of the present invention is that it can drive electromagnetic rotary devices such as alternators or generators, because it is mounted on the crankshaft rather than on the rotary device.

Another principal object and advantage of the present invention is that it can improve fuel mileage and create a cleaner burning engine, thus reducing air pollution, saving scarce resources, and having a positive impact on the environment.

BRIEF DESCRIPTION OF THE DRAWINGS

FIG. 1A shows the detail of the spring means (14) in FIG. 1.

FIG. 3 is a schematic of a third embodiment of the present invention.

DETAILED DESCRIPTION OF THE PREFERRED EMBODIMENTS

Figure 1:
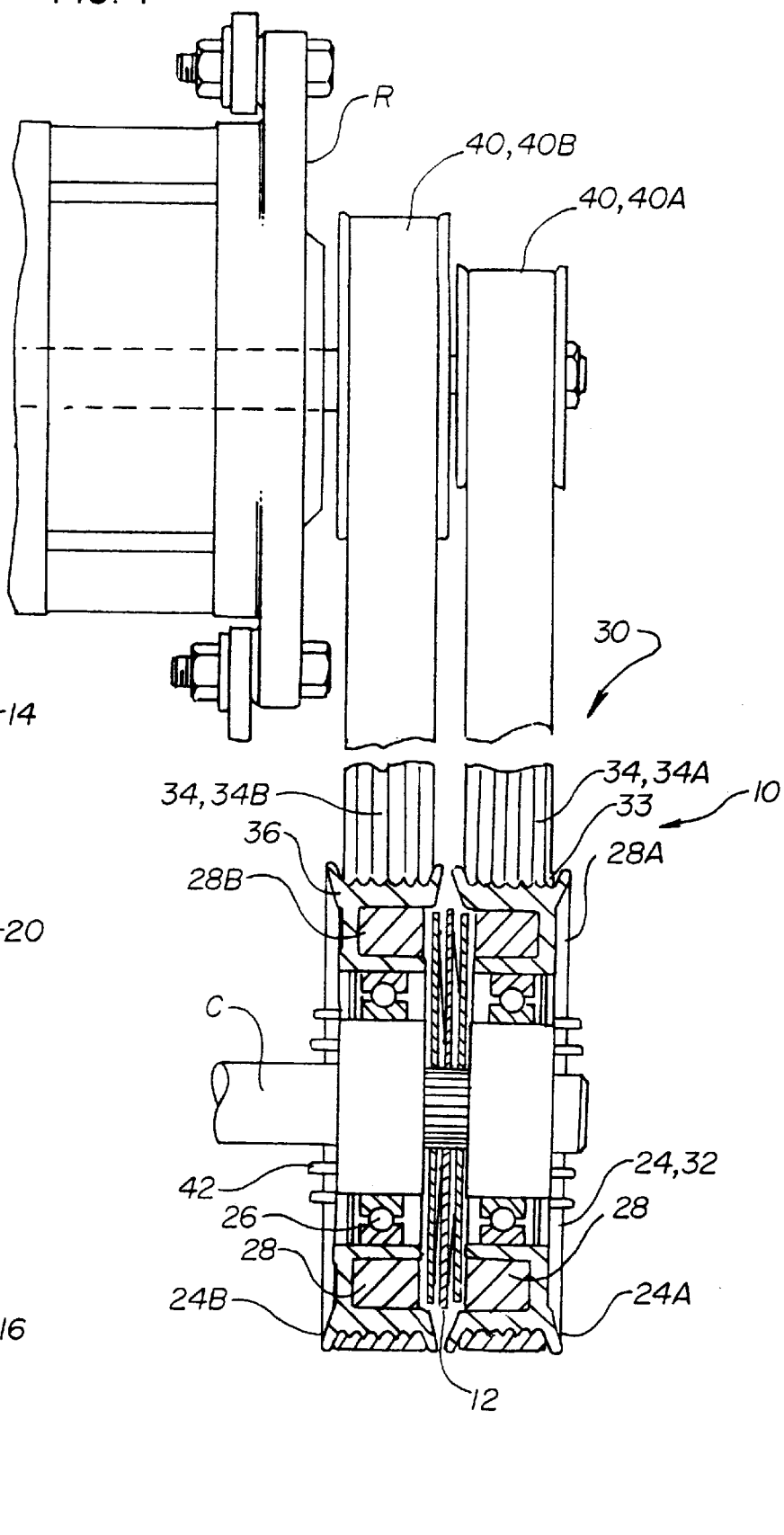
FIG. 1 is a schematic of a first embodiment of the present invention.

The electromagnetic clutch of the present invention is generally designated in the Figures as reference numeral 10.

The electromagnetic clutch further comprises a clutch support plate 12 mounted to the engine's crankshaft C. The support plate 12 is mounted to the crankshaft C as to prevent lateral as well as rotational movement with respect to the crankshaft C, as by means of snap rings and key ways (not shown), or other fixed connection.

A spring means 14, such as one or more leaf springs 16 are connected to the clutch support plate 12 at one end, 18.

A pair of clutch plates or armatures 20 are connected to the spring means 14 or leaf springs 16 at the other end, 22 of the leaf springs 16, and the spring means 14 or leaf springs 16 bias the clutch plates 20 toward the clutch support plate 12. As can be seen, the clutch plates 20 are preferably located one on either side of the clutch support plate 12.

A pair or rotors 24 are mounted to the crankshaft about bearings 26, with the bearings 26 being fixed to the crankshaft C through means such as snap rings and key ways (not shown), thus preventing movement of the bearings 26 laterally with respect to the crankshaft, as well as rotationally. It will be seen that the rotors do not normally rotate with the crankshaft C, but rather are free-running about the bearings 26.

An electromagnet 28 is fixedly engaged to each of the rotors 24. The electromagnet 28 is adapted to attracts one of the clutch plates 20 against one of the rotors 24, thereby transferring the rotational force of the crankshaft C to the rotor 24. The electromagnet 28 engaged to the other rotor attracts the other clutch plate 20 to that rotor when energized.

A transmission means 30 is connected to each of the rotors 24 and to the rotary device R, to transmit the rotary motion of the crankshaft C to the rotary device R.

In the preferred embodiment, each rotor 24 comprises a pulley 32 and the transmission means 30 comprises a belt 34, the pulley 32 having a groove 33 for receiving the belt 34. However, other alternative implementations might involve the rotor 24 transmitting power to the rotary device R by other mechanical means, such as by direct frictional contact, by a chain, linkage, etc.

In the preferred embodiment, the electromagnet 28 is fixedly mounted in a channel 36 formed within the pulley 32. The channel 36 serves to protect the windings of the electromagnet 28.

In the preferred embodiment, the electromagnetic clutch 10 further comprises a pair of rotary device pulleys 40 adapted to be attached to the rotary device R and connected by the belts 34 to the pulleys 32 It will be seen that the belts 34 transfer rotational motion of the crankshaft C from the pulleys 32 to the rotary device pulleys 40, which in turn cause the rotary device to rotate.

To provide for two-speed operation of the rotary device R, the rotary device pulleys 40 may have different diameters, as shown in FIG. 1. As will be seen, the rotary device pulley 40a with the smaller diameter will, when driven by pulley 24a, drive the rotary device at higher rotational speed than will the rotary device pulley 40b when driven by pulley 24b.

Figure 2:
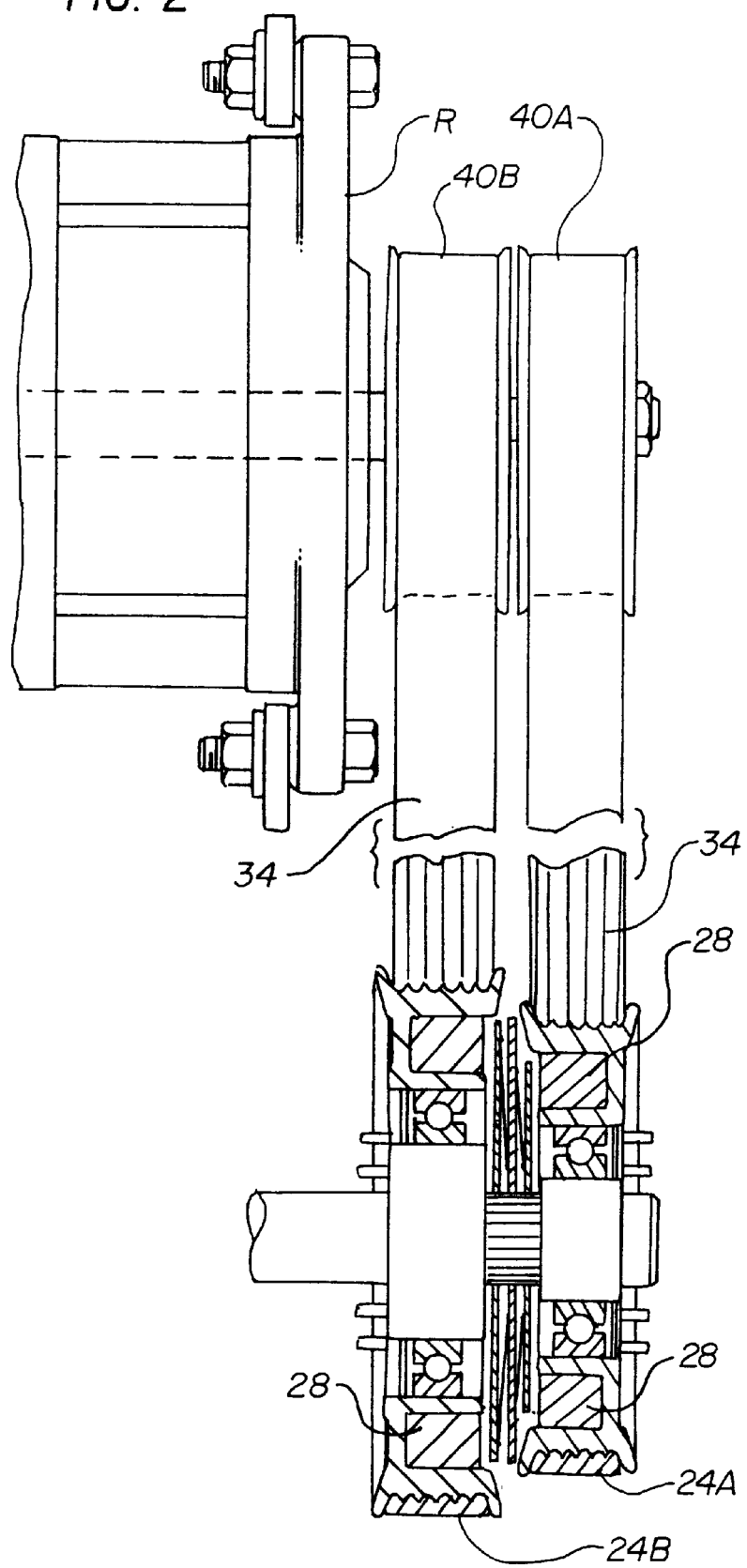
FIG. 2 is a schematic of a second embodiment of the present invention.

A second preferred embodiment is shown in FIG. 2. Here, the rotary device pulleys 40a, 40b are of the same diameter, while the pulleys 24a, 24b are of different diameters. The same effect is achieved as in FIG. 1 of achieving two-speed operation. The embodiment of FIG. 1 is preferred over that of FIG. 2, because having the two pulleys 24a, 24b of equal diameter allows the same amount of power to be transferred through them at both speeds, without compromising the strength of the pulley.

A third embodiment is shown in FIG. 3. Here, both the rotary device pulleys 40a, 40b and the pulleys 24a, 24b may have different diameters, allowing a greater speed differential between the two positions of the clutch.

The electromagnets 28 are preferably energized through electric brushes 42 that ride on collars that rotate with the bearings 26 and electromagnets 28. Electrical power is supplied to the brushes 42 to the collars (not shown) that maintain a permanent contact with the electromagnets, allowing the electromagnets 28 to rotate with respect to the engine's crankshaft C.

Operation of the clutch is as follows. When engine sensors (not shown) determine that the engine's rotational speed is sufficiently slow to warrant a higher engine to belt drive ratio, electromagnet 28a (FIG. 1) is energized thereby attracting clutch plate 20 that is attached to clutch support plate 12 through the array of leaf springs 16. This attraction will move the clutch plate 20 through the air gap and into frictional contact with pulley 24a, thereby causing pulley 24a to rotate, driving belt 34a and rotary device pulley 40a. When the engine is speeding up the sensors (not shown) can deactivate electromagnet 28a, thereby releasing the clutch plate 20, then activate electromagnet 28b, thereby attracting the other clutch plate 20 through the other air gap into frictional contact with pulley 24b, causing pulley 24b to rotate, driving belt 34b and rotary device pulley 40b, and causing less differential between the speed of the crankshaft C and that of the rotary device R.

Clutch 10 may be adapted to drive multiple rotary devices R, as by extending the belts 34 to encompass pulleys on the other rotary devices or other equivalent mechanism.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A cranks aft-mounted, multiple-speed electromagnetic clutch for driving multiple rotary devices of an engine, the engine having a crankshaft, the clutch comprising:
   (a) a clutch support plate mounted to the crankshaft;
   (b) spring means connected to both sides of the clutch support plate;
   (c) a pair of clutch plates connected to said spring means and said spring means biasing said pair of clutch plates toward said clutch support plate;
   (d) a pair of rotors, each rotor positioned adjacent said clutch plates, rotating about the crankshaft on bearings;
   (e) an electromagnet fixedly engaging each of said rotors and adapted to attract one of said clutch plates against said rotor, thereby transferring the rotational force of the crankshaft to said rotor; and
   (f) transmission means connecting each of said rotors to at least one of the rotary devices.

2. The electromagnetic clutch of claim 1, wherein each of said rotors comprises a pulley and said transmission means comprises a belt, said pulley having a groove for receiving said belt.

3. The electromagnetic clutch of claim 2, wherein said pulley further comprises a channel, said electromagnets being fixedly mounted in said channel.

4. The electromagnetic clutch of claim 2, further comprising a pair of rotary device pulleys adapted to be attached to the rotary device and connected by said belts to said pulleys.

5. The electromagnetic clutch of claim 4, wherein said rotary device pulleys have different diameters, thereby driving the rotary device at different rotational speeds relative to the crankshaft, depending on which pulley is being rotated by the crankshaft.

6. The electromagnetic clutch of claim 4, wherein said pulleys have different diameters, thereby driving the rotary device at different rotational speeds relative to the crankshaft, depending on which pulley is being rotated by the crankshaft.

7. The electromagnetic clutch of claim 4, wherein said pulleys and said rotary device pulleys have different diameters, thereby driving the rotary device at different rotational speeds relative to the crankshaft, depending on which pulley is being rotated by the crankshaft.

8. The electromagnetic clutch of claim 1, wherein said clutch is adapted to drive multiple rotary devices.

9. A crankshaft-mounted, multiple-speed electromagnetic clutch for driving a rotary device of an engine, the engine having a crankshaft, the clutch comprising:
   (a) a clutch support plate mounted to the crankshaft;
   (b) spring means connected to both sides of the clutch support plate;
   (c) a pair of clutch plates connected to said spring means and said spring means biasing each of said clutch plates toward said clutch support plate;
   (d) a pair of pulleys, each pulley positioned adjacent said clutch plates, rotating about the crankshaft on bearings, each pulley having a groove for receiving a belt and also having a formed channel within said pulley;
   (e) an electromagnet mounted in each of said formed channels and adapted to attract one of said clutch plates against the pulley wherein the electromagnet is mounted, thereby transferring the rotational force of the crankshaft to that pulley;
   (f) a pair of rotary device pulleys adapted to be attached to the rotary device; and
   (g) a pair of belts, each belt connecting one of said pulleys to one of said rotary device pulleys.

10. The electromagnetic clutch of claim 9, wherein said rotary device pulleys have different diameters, thereby driving the rotary device at different rotational speeds relative to the crankshaft, depending on which pulley is being rotated by the crankshaft.

11. The electromagnetic clutch of claim 9, wherein said pulleys have different diameters, thereby driving the rotary device at different rotational speeds relative to the crankshaft, depending on which pulley is being rotated by the crankshaft.

12. The electromagnetic clutch of claim 9, wherein said pulleys and said rotary device pulleys have different diameters, thereby driving the rotary device at different rotational speeds relative to the crankshaft, depending on which pulley is being rotated by the crankshaft.

13. The electromagnetic clutch of claim 9, wherein said clutch is adapted to drive multiple rotary devices.

14. A crankshaft-mounted, multiple-speed electromagnet is clutch for driving a rotary device of an engine, the engine having a crankshaft, the clutch comprising:

(a) a clutch support plate fixedly mounted to the crankshaft;

(b) a plurality of leaf springs connected to both sides of the clutch support plate;

(c) a pair of clutch plates connected to said plurality of leaf springs and said plurality of leaf springs biasing each of said clutch plates toward said clutch support plate;

(d) a pair of pulleys, each pulley positioned adjacent said clutch plates, rotating about the crankshaft on bearings, each pulley having a groove for receiving a belt and also having a formed channel within said pulley;

(e) an electromagnet mounted in each of said formed channels and adapted to attract one of said clutch plates against the pulley wherein the electromagnet is mounted, thereby transferring the rotational force of the crankshaft to that pulley;

(f) a pair of rotary device pulleys adapted to be attached to the rotary device; and (g) a pair of belts, each belt connecting one of said pulleys to one of said pair of rotary device pulleys wherein said rotary device pulleys have different diameters, thereby driving the rotary device at different rotational speeds relative to the crankshaft, depending on which pulley is being rotated by the crankshaft.

15. The electromagnetic clutch of claim 14, wherein said clutch is adapted to drive multiple rotary devices.

* * * * *